(12) United States Patent
Lin et al.

(10) Patent No.: US 7,677,782 B2
(45) Date of Patent: Mar. 16, 2010

(54) LED FLAT LAMP

(75) Inventors: Chang-Yao Lin, Dashi (TW); Ren-Cheng Chao, Dashi (TW); Yung-Chung Sung, Dashi (TW)

(73) Assignee: Arima Optoelectronics Corp., Taoyuan County (TW)

( * ) Notice: Subject to any disclaimer, the term of this patent is extended or adjusted under 35 U.S.C. 154(b) by 236 days.

(21) Appl. No.: 12/010,002

(22) Filed: Jan. 18, 2008

(65) Prior Publication Data

US 2009/0185372 A1    Jul. 23, 2009

(51) Int. Cl.
*F21V 7/04* (2006.01)
(52) U.S. Cl. .................. 362/602; 362/603; 362/612; 362/373
(58) Field of Classification Search ......... 362/602–605, 362/606, 607, 612, 613, 630–634, 600, 373, 362/294, 33, 249.02, 800
See application file for complete search history.

(56) References Cited

U.S. PATENT DOCUMENTS

| | | | |
|---|---|---|---|
| 6,709,123 B2 * | 3/2004 | Flohr et al. ................. 362/603 |
| 7,452,109 B2 * | 11/2008 | Noh et al. ................... 362/294 |
| 7,597,462 B2 * | 10/2009 | Misof .......................... 362/368 |
| 2002/0043012 A1 * | 4/2002 | Shibata et al. ................ 40/546 |
| 2004/0095741 A1 * | 5/2004 | Chen ............................ 362/31 |
| 2005/0185421 A1 * | 8/2005 | Hayakawa ................... 362/612 |
| 2006/0203510 A1 * | 9/2006 | Noh et al. .................... 362/580 |

* cited by examiner

*Primary Examiner*—Bao Q Truong
(74) *Attorney, Agent, or Firm*—Rosenberg, Klein & Lee

(57) ABSTRACT

An LED flat lamp including a housing with a light-emitting area at the bottom thereof. The internal side thereof undergoes a reflexion treatment. At least one LED is disposed within the housing. A power connector is extended from the LED to the outside. The LED is installed on a circuit board. A light guide plate is installed at one side of the LED within the housing. The light exit side of the light guide plate is provided with a microstructure for a uniform light exit. Moreover, an optical film unit is attached to the bottom of the light guide plate such that the light-emitting area of the housing is covered with the optical film unit. The optical film unit consists of one or several brightness enhancement films and one or several diffusers. In this way, the problem of glaring light directly emitted by the prior art is resolved. The LED flat lamp in accordance with the invention can emit a non-glaring light and can be modularized into a standardized product.

4 Claims, 5 Drawing Sheets

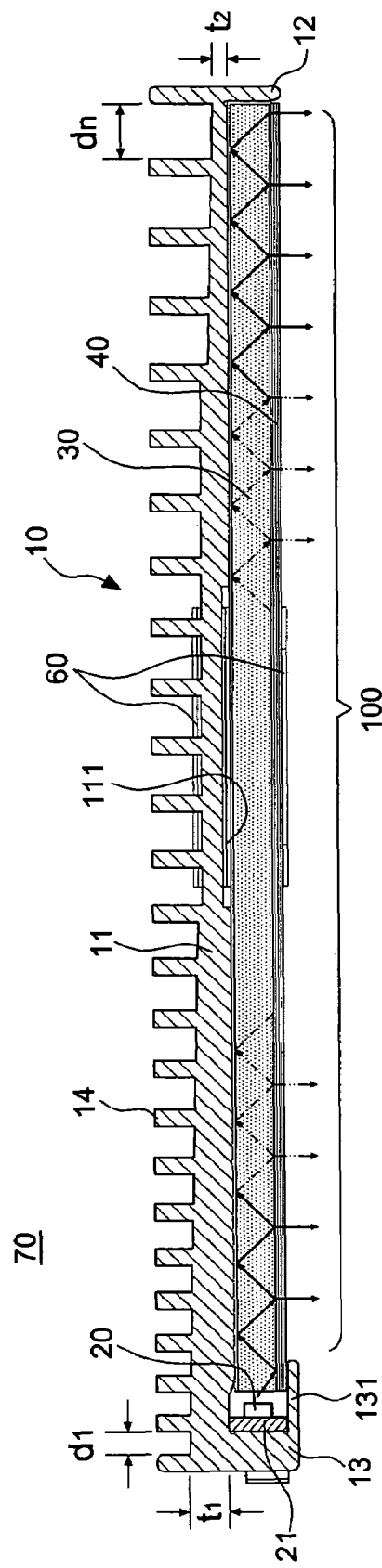
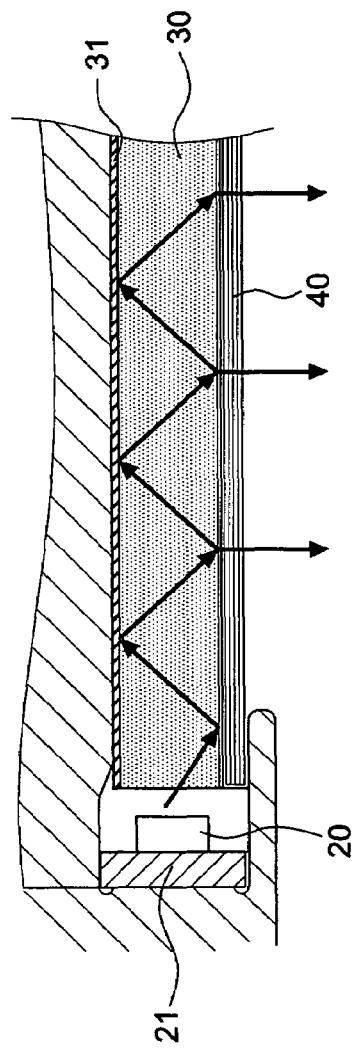
FIG.6
FIG.7

LED FLAT LAMP

BACKGROUND OF THE INVENTION

1. Field of the Invention

The invention relates to an LED flat lamp, and more particularly to an LED flat lamp that can be modularized and includes an optical film unit for treating the glaring light.

2. Description of the Related Art

With the environment-protecting and power-saving tendency, LEDs having the advantages of low power consumption, long life and non-pollution become the new generation light source. Thus, the LEDs employed to be light source of lamps become more and more popular. In fact, several LEDS are combined together to reach a required brightness by collecting the "point" light sources. In addition to the brightness, there are many other factors in taking the illumination into account. The light rays emitted by the point light sources of LEDs (without optical treatment) can be much glaring to the eyes of the user in reading. In other words, the light provided by the LEDs does not permit a comfortable reading. However, most of the conventional LED lamps have light rays directly emitted therefrom.

In order to meet the requirement of the market, the LED lighting lamps must not be so big as the lamp tube or bulb when they are used as flat light source for table lamps. Moreover, the cooling problem of the LEDs has troubled the manufacturers for a long time. Particularly, how to achieve an efficient cooling effect for the flat-thin light source requires a further improvement.

In addition, most of the conventional LED lamps are not standardized. Unlike the conventional lamp tubes or bulbs, they cannot be applied to a predetermined place at any time. As a result, it also requires a further improvement.

SUMMARY OF THE INVENTION

An object of the invention is to provide an LED flat lamp that resolves the problem of the conventional lamp that emits light rays glaring to the eyes and ensures the emission of non-glaring light.

Another object of the invention is to provide an LED flat lamp that is modularized in standardized product. At the same time, the modularized housing provides an excellent cooling effect according to the features of the LED light source, thereby prolonging the service life of the lamp.

In order to achieve the above-mentioned object, the invention includes:

a) a housing having a light-emitting area formed under the housing;

b) a plurality of LEDs disposed at one or several sides within the housing, a power connector being extended to the outside;

c) a light guide plate disposed at one side of LEDs within the housing; and d) an optical film unit attached to the bottom of the light guide plate such that the light-emitting area of the housing is covered with the optical film unit, the optical film unit consisting of one or several brightness enhancement films and one or several diffusers.

BRIEF DESCRIPTION OF THE DRAWINGS

The accomplishment of this and other objects of the invention will become apparent from the following descriptions and its accompanying figures of which:

FIG. 6 is a cross-sectional view taken along line 6-6 of FIG. 4;

FIG. 7 is an enlarged cutaway view of the partial structure in FIG. 6; and

DETAILED DESCRIPTION OF THE PREFERRED EMBODIMENT

Figure 1:
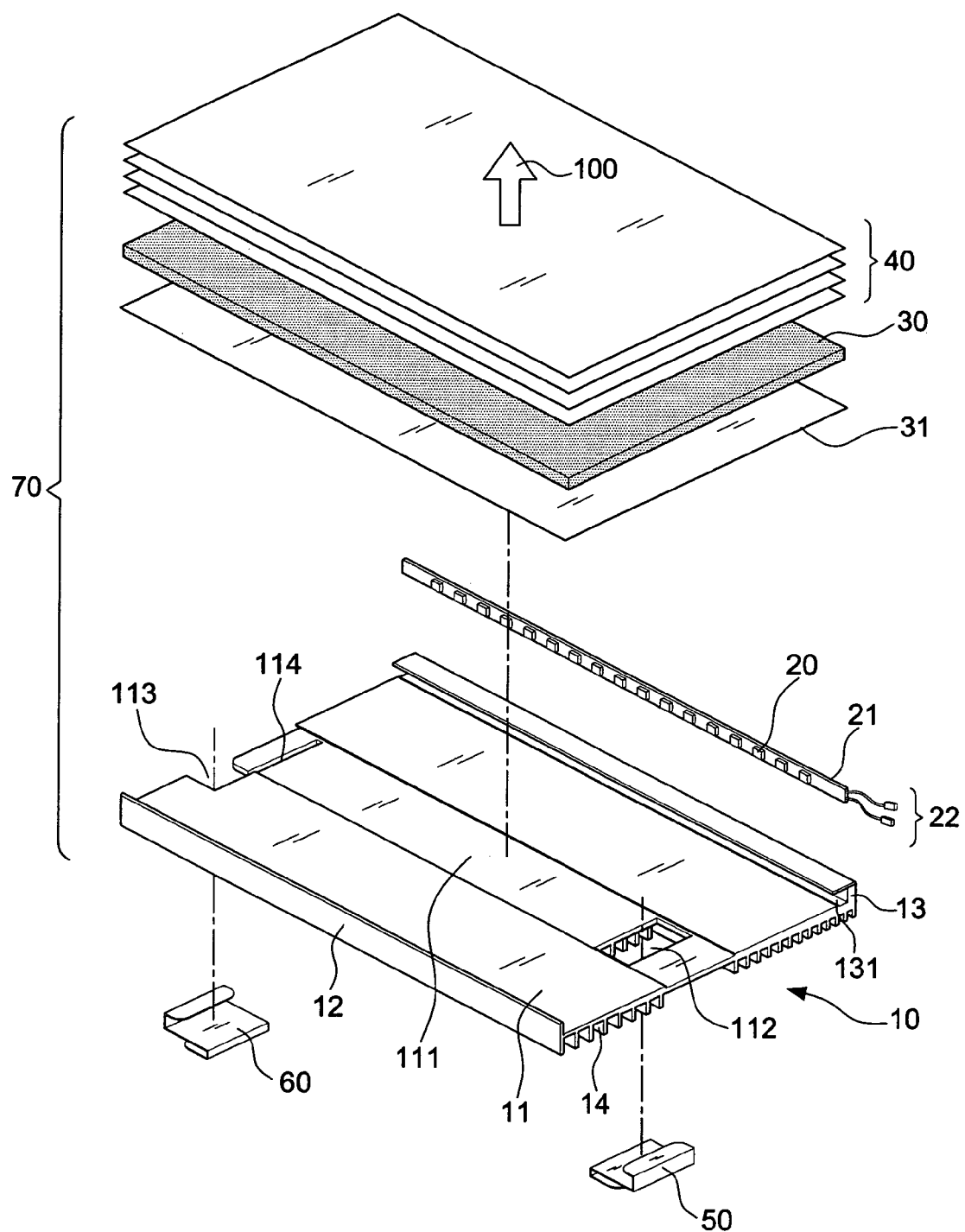
FIG. 1 is an exploded perspective view of a preferred embodiment of the invention.
Figure 2:
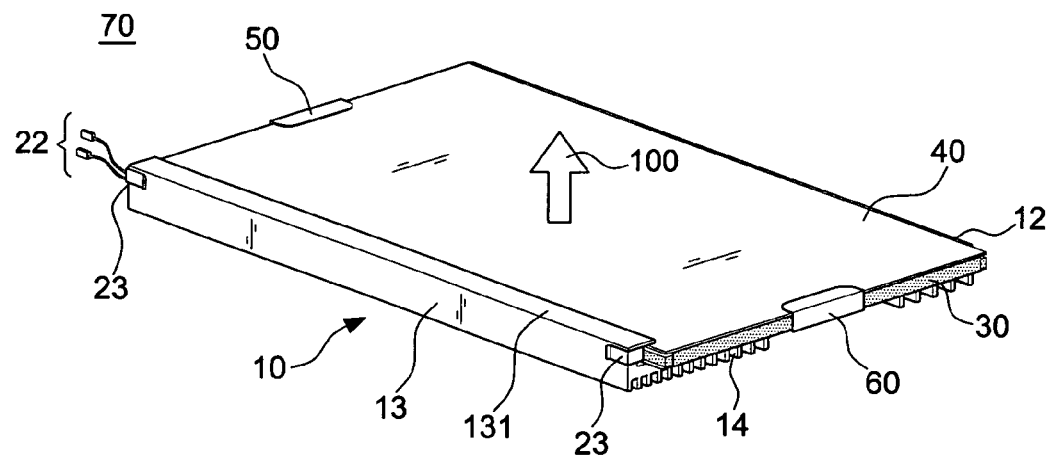
FIG. 2 is a perspective assembly view of the preferred embodiment of the invention.
Figure 3:
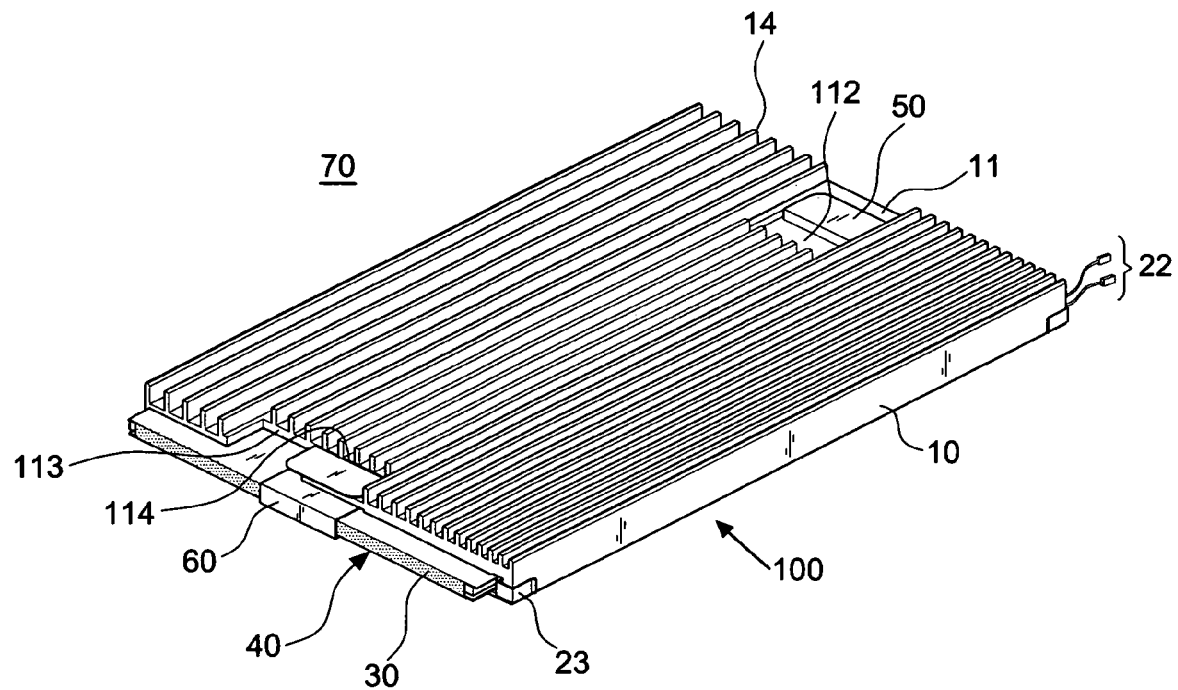
FIG. 3 is a perspective view of the invention observed from the other side.

First of all, referring to FIGS. 1 through 3, FIGS. 1 and 2 are drawings of the invention in an opposite direction. An LED flat lamp 70 in accordance with the embodiment of the invention has an LED light source at a single side. The LED flat lamp 70 includes a housing 10, a plurality of LEDs 20, a light guide plate 30, and an optical film unit 40.

The housing 10 includes a top plate 11. A light-emitting area 100 is formed under the housing 10 (see FIG. 6). According to the embodiment, the housing 10 includes a first side plate 12 perpendicular to the top plate 11 and a second side plate 13 at an opposing side of the housing 10. The second side plate 13 is provided with a locking groove 131 extending inwardly. A recessed portion 111 is formed at the center of the internal side of the top plate 11. One side of the recessed portion 111 includes a through hole 112 near the end thereof. A slot 114 is formed at an opposite side of the recessed portion 111. An indentation 113 is disposed adjacent to the slot 114. A plurality of cooling ribs 14 is integrally formed at the external side of the top plate 11.

The LEDs 20 are disposed at one side within the housing 10. According to a preferred embodiment, the LEDs 20 are installed within the second side plate 13 having the locking groove 131. The LEDs 20 may be mounted on a circuit board 21, thereby forming a modularized strip that ensures a convenient insertion into the locking groove 131. Moreover, a power connector 22 is extended from one side of the circuit board 21 to the outside. The power connector 22 includes a positive and a negative wire, terminal, or connector. In addition, both ends of the locking groove 131 can be sealed with a fixing element 23 for fixing the circuit board 21 in place.

The light guide plate 30 is disposed at one side of LEDs 20 within the housing 10. That is, the light guide plate 30 is interposed between the first and second side plates 12, 13 as well as rests against the top plate 11. According to a preferred embodiment, the top side or the light exit side of the light guide plate 30 is provided with a microstructure for a uniform light exit. Alternatively, the inside of the light guide plate 30 is mixed with substances for scattering the light. Besides, a reflexion layer 31 may be disposed on the top of the light guide plate 30.

The optical film unit 40 is attached to the bottom of the light guide plate 30 such that the light-emitting area 100 of the housing 10 is covered with the optical film unit 40. The optical film unit 40 consists of one or several brightness enhancement films (BEF) and one or several diffusers all of which are stacked to one another.

Figure 4:
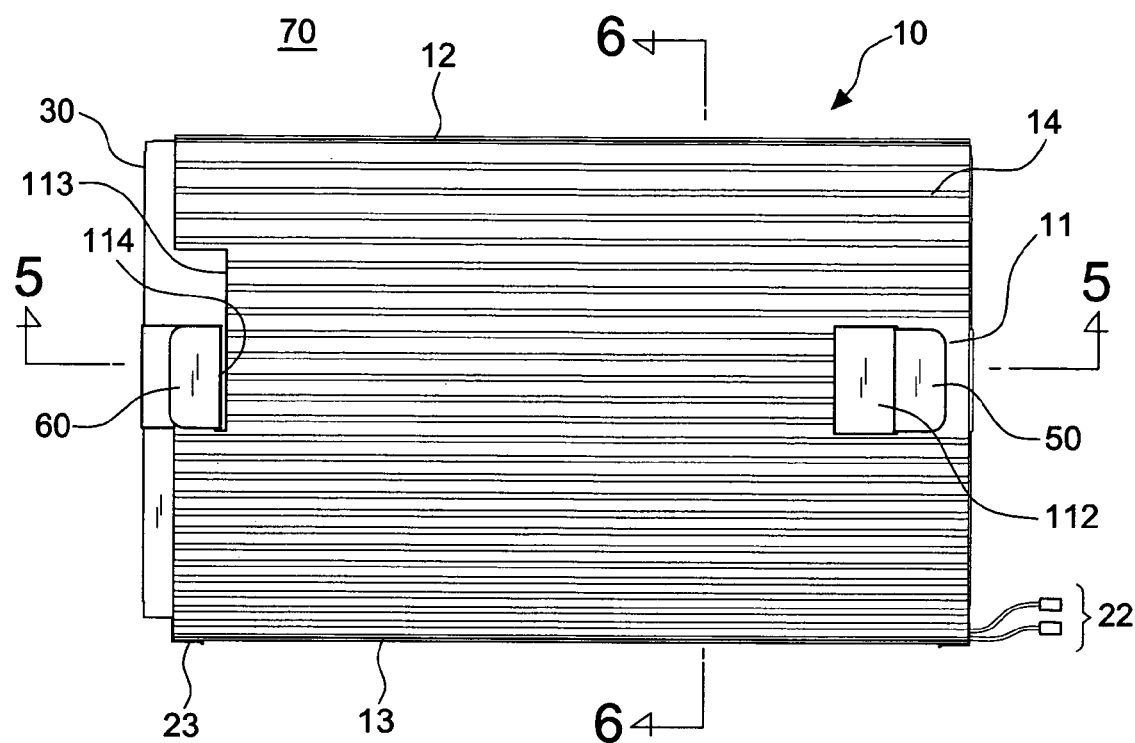
FIG. 4 is a top view of FIG. 3.
Figure 5:
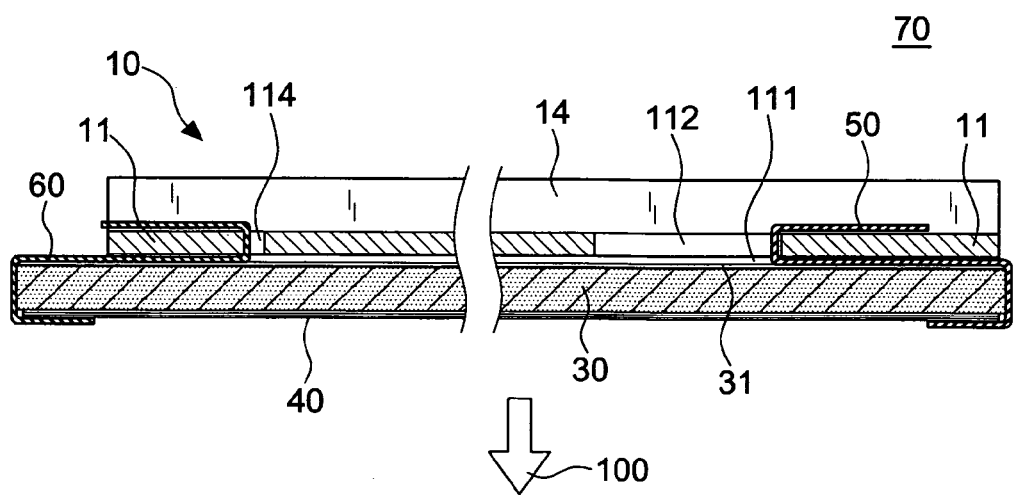
FIG. 5 is a cross-sectional view taken along line 5-5 of FIG. 4.

According to a preferred embodiment, a first S-shaped clamp 50 is employed for fixing the light guide plate 30 within the housing 10. One end of the S-shaped clamp 50 passes through a through hole 112 at one end of the recessed portion 111 while the other end is hooked on the side of the through hole 112. When the light guide plate 30 fits into the housing 10, a second S-shaped clamp 60 is engaged from the indentation 113 at the opposing side into the slot 114. Thus, a reliable fixing of the light guide plate 30 is achieved by the S-shaped clamp with one end clamping the top plate 11 and with the other end clamping the light guide plate 30. As shown in FIGS. 4 and 5, both ends of the top plate 11 are clamped by the clamping opening at the top of the first and second S-shaped clamps 50, 60 while the light guide plate 30 is clamped by the clamping opening at the bottom thereof. As a result, a convenient assembly is achieved without covering the light-emitting area 100.

As shown in FIG. 6 which illustrates a cutaway view of the structure of the invention, the top plate 11 of the housing 10 is tapered from one side having the LEDs 20 to the other side. That is, the thickness of the top plate 11 is reduced from t1 to t2. The distance d1 of the cooling ribs 14 on the top plate 11 is smaller in approaching to the LEDs 20. To the contrary, the distance dn thereof is bigger in approaching to the tail. In other words, the cooling ribs 14 become less in approaching to the tail. The above-mentioned configuration is arranged in a decreasing way from a near position to a far position according to the heat emitted by the LEDs 20, thereby achieving an optimal cooling effect.

Figure 8:
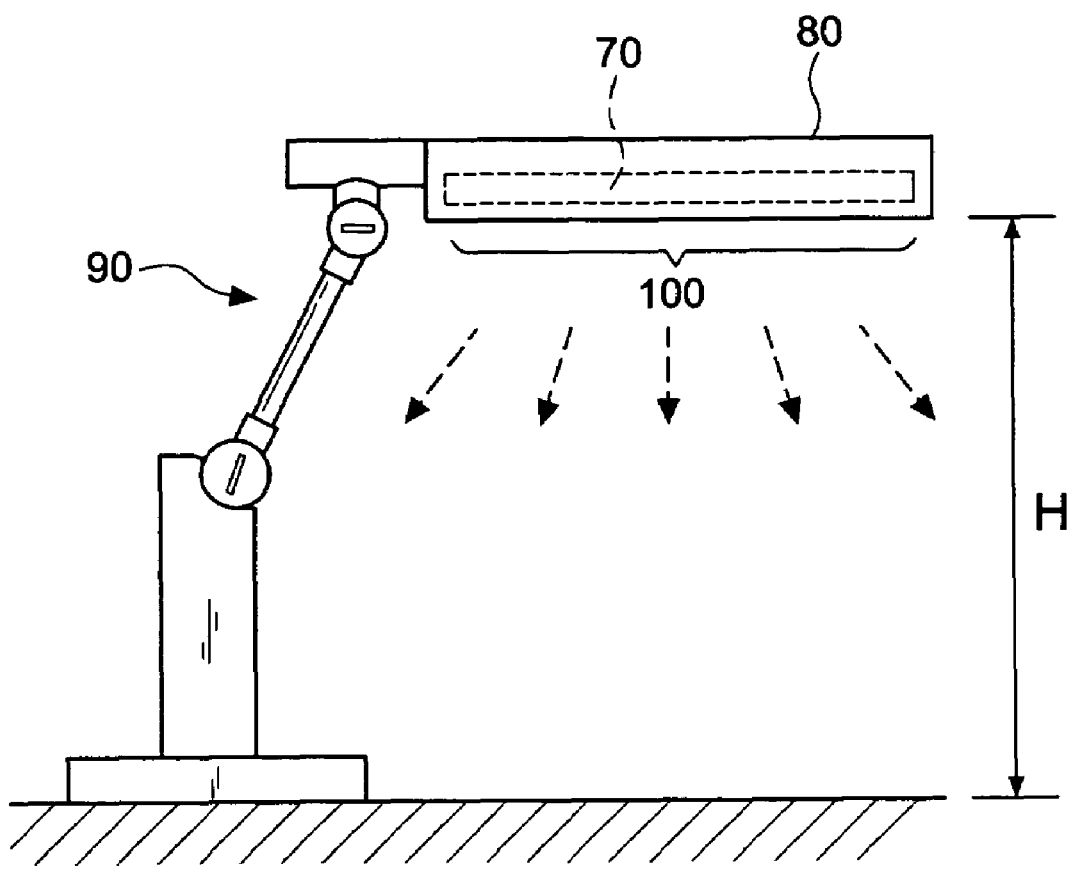
FIG. 8 is a schematic drawing of the invention in an application state.

Based on the above-mentioned structure, the point or line light source created by the LEDs 20 is converted into a surface light source under the influence of the light guide plate 30. Thereafter, the brightness at the front side will be enhanced by the brightness enhancement films of the optical film unit 40. Meanwhile, the light becomes more uniform by use of the diffuser such that the light beams projected are mild and not glaring to the eyes. As a result, the light beams are suitable for reading. Moreover, the housing 10 is packaged in a modularized way such that a standardized product is created. Thus, an application of the invention to a table lamp 90 is achieved (see FIG. 8). That is, the LED flat lamp 70 in accordance with the invention can serve as a conventional lamp and is easily installed within a lampshade 80 of the table lamp 90. Moreover, the light projected from the light-emitting area 100 to the table height H is mild and not glaring to the eyes so that it is much suitable for reading.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An LED flat lamp, comprising:
   a) a housing having a top plate, a first and a second side plate being positioned at both sides of the top plate, a light-emitting area being formed under the housing;
   b) a plurality of LEDs disposed on a circuit board and positioned within the second side plate of the housing, a power connector being extended from one side of the circuit board;
   c) a light guide plate disposed at one side of LEDs within the housing; and
   d) an optical film unit attached to the bottom of the light guide plate such that the light-emitting area of the housing is covered with the optical film unit, the optical film unit consisting of one or several brightness enhancement films and one or several diffusers.

2. The LED flat lamp as recited in claim 1 wherein a reflexion layer is disposed on the top of the light guide plate.

3. The LED flat lamp as recited in claim 1 wherein a recessed portion is formed at the center of the internal side of the top plate of the housing.

4. An LED flat lamp, comprising:
   a) a housing having a top plate, a first and a second side plate being positioned at both sides of the top plate, a light-emitting area being formed under the housing, the second side plate being provided with a locking groove extending inwardly, a recessed portion being formed at the internal side of the top plate, one side of the recessed portion having a through hole near the end thereof, a slot being formed at an opposite side of the recessed portion, an indentation being disposed adjacent to the slot, a plurality of cooling ribs being integrally formed at the external side of the top plate;
   b) a plurality of LEDs disposed on a circuit board and positioned within the second side plate of the housing, a power connector being extended from one side of the circuit board;
   c) a light guide plate disposed at one side of LEDs within the housing;
   d) an optical film unit attached to the bottom of the light guide plate such that the light-emitting area of the housing is covered with the optical film unit, the optical film unit consisting of one or several brightness enhancement films and one or several diffusers; and
   e) a first S-shaped clamp having a top end hooked at the side of the through hole of the top plate and a bottom end clamped at the end of the light guide plate; and
   f) a second S-shaped clamp disposed opposing to the first S-shaped clamp, the top end of the second S-shaped clamp being hooked in the slot at the other end of the top plate while the bottom end is clamped at the other side of the light guide plate opposing to the first S-shaped clamp.

* * * * *